United States Patent
Gavaza, III

(10) Patent No.: US 6,224,011 B1
(45) Date of Patent: May 1, 2001

(54) FISHING ROD RESPOOLER

(76) Inventor: John H. Gavaza, III, 253 Main St., Apt. #2, Wareham, MA (US) 02571

(*) Notice: Subject to any disclaimer, the term of this patent is extended or adjusted under 35 U.S.C. 154(b) by 0 days.

(21) Appl. No.: 09/320,563

(22) Filed: May 27, 1999

(51) Int. Cl.[7] .......................... B65H 49/26; A01K 89/00
(52) U.S. Cl. ................ 242/597.4; 242/400; 242/406; 242/423.2; 242/902
(58) Field of Search .................... 242/902, 597.4, 242/597.8, 423.1, 423.2, 406, 400

(56) References Cited

U.S. PATENT DOCUMENTS

| | | |
|---|---|---|
| 902,787 | 11/1908 | Wiebke . |
| 1,795,043 | 3/1931 | Ross . |
| 2,727,702 | 12/1955 | Latincich . |
| 3,215,361 | 11/1965 | Jones, Jr. . |
| 3,647,155 | * 3/1972 | Jorgenson . |
| 3,951,354 | 4/1976 | Bagby . |
| 4,322,198 | * 3/1982 | Zuber ............................. 242/406 X |
| 4,360,172 | 11/1982 | Cope . |
| 4,555,862 | 12/1985 | Panasewich ....................... 43/54.1 |
| 4,708,244 | 11/1987 | Fish et al. ...................... 206/315.11 |
| 4,780,982 | 11/1988 | Black et al. ........................ 43/54.1 |
| 4,948,059 | * 8/1990 | Lewitt ............................ 242/902 X |
| 4,958,784 | 9/1990 | Totten . |
| 5,544,839 | 8/1996 | Burch .............................. 242/396.6 |
| 5,725,172 | * 3/1998 | Koehler et al. ................. 242/902 X |

* cited by examiner

Primary Examiner—Donald P. Walsh
Assistant Examiner—William A. Rivera
(74) Attorney, Agent, or Firm—Richard C. Litman

(57) ABSTRACT

A fishing line spool holder for facilitating the transfer of fishing line from a supply spool to a fishing reel. The spool holder is adapted to mount to the outside of a tackle box or other suitable surface. It includes a mounting bracket and a substantially L-shaped respooling arm pivotally attached to the mounting bracket. The pivoting action allows the respooling arm to be placed in a retracted position flush with the surface to which it is mounted when not in use. A frictionally engaging notch mechanism locks the arm into respooling position prior to use. The device further includes at least one tension-cap to prevent uncontrolled rotation and unfurling of the supply spool fishing line during respooling, and at least one ball-bearing washer to assure that the mounting plate apparatus does not interfere with the respooling operation.

19 Claims, 2 Drawing Sheets

FISHING ROD RESPOOLER

BACKGROUND OF THE INVENTION

1. Field of the Invention

The present invention relates generally to spooling devices, and more particularly to fishing line respoolers and respooler holders.

2. Description of Related Art

It is common knowledge that fishing line is generally packaged and sold on plastic spools. The usual procedure for replacing the fishing line in a reel on a fishing rod is to connect the end of the line on a supply spool to the rod and reel in the normal manner and then to wind the line off the supply spool and onto to the reel with the reel winding mechanism.

The process, while appearing to be quite simple, is really not so easy to practice in the absence of devices facilitating the process, especially for one person acting alone. The supply spool must be held in place and allowed to spin in order to dispense the line in an orderly manner without tangling. At the same time, however, it requires both of a person's hands merely to hold the fishing rod and to operate the winding mechanism of its reel. Consequently, if a second person is not available to assist, some other means must be employed to hold the supply spool in a spinnable manner.

Finding some other device to hold the supply spool in a spoolable manner can become a significant problem especially when the need to replace the fishing line arises in the middle of a fishing excursion. In the absence of a device specifically adapted to hold the supply spool in a spinnable manner, the seemingly simple task of winding new line onto a fishing reel can quickly become a frustrating, time-consuming experience, quite easily resulting in a tangled, wildly strewn mass of loose fishing line.

Given the manifest need for a device of this type for use especially during fishing excursions, it is further desirable that the device be readily at hand for use when needed. The most convenient sort of location for a respooling device intended for use during fishing excursions is on an exposed and readily accessible surface, such as the side of a fishing tackle box or an exposed location on a boat, dock, or the like. Additionally, it is desirable that a respooling device adapted to be mounted on a surface of this sort be constructed in a manner which allows it to be moved completely out of the way when not in use.

The prior art contains several examples of fishing line respooling devices. U.S. Pat. No. 2,727,702, issued to Latincich, describes a hand-cranked fishing line respooling mechanism which is readily attachable to a supporting structure by means of a C-clamp. The device is ill-suited for use on fishing excursions, however, since it is by no means guaranteed that a suitable supporting will be available while fishing from a boat, dock, or streamside.

U.S. Pat. No. 3,951,354, issued to Bagby, describes a fishing reel loading and unloading device which is adapted for removable attachment to the shaft of a fishing rod in a position either in front of or to the rear of the reel to be replenished or stripped with its aid. The device is equipped with a crank means for spooling a spent supply of line thereon from a reel; this crank means may be disengaged in the event that the device is instead to be used to replenish the supply of line on a fishing reel. The use of this device is problematic for two reasons, however. First, the apparatus whereby the respooler is removably attached to the rod is quite elaborate and cumbersome to attach. Second, the respooling device together with the associated mounting apparatus is rather bulky and heavy, and is therefore not convenient to store and carry on fishing excursions.

U.S. Pat. No. 4,360,172, issued to Cope, describes a respooling device for fishing reels which consists of a holder for a spool of bulk line that is permanently mountable on any rigid support. The supply line arm may be adjusted to position the spool in various positions relative both to the support and to the fishing rod so as to enable twist-free and kink-free spooling of the line onto the reel, regardless of the type of reel being used. This invention suffers from a significant disadvantage, however, in that its use requires its spooling arm to protrude conspicuously and in a potentially interfering manner from its associated mounting surface. Unfortunately, the device lacks a storage position wherein the spooling arm is neatly tucked away when not in use.

U.S. Pat. No. 4,555,862, issued to Panasewich, describes a fishing tackle box having a number of separate housings adjacent the front of the box wherein spools of fishing leader lines may rotate freely about their own axes. The loose free ends of leader line from the spools extend out the front side of the box through a slot therein. Means are provided exteriorly of the box for cutting leader line as it is pulled from the openings after being used to respool a reel. This particular configuration is impractical, however, in that it requires substantial modification of the tackle box's interior and front face, and is therefore also quite costly to implement. Moreover, a significant amount of space within the tackle box is thus lost to the user.

U.S. Pat. No. 4,708,244, issued to Fish et al., discloses a fishing line spool holder for tackle boxes which are specifically equipped with trays. The spool holder includes a spindle on which the fishing spool is rotatably mounted, a support for holding the spindle, and means for engaging the support with the tackle box tray. U.S. Pat. No. 4,780,982, issued to Black et al., discloses a fishing line dispenser also for use with tackle boxes equipped with trays which consists of an elongated spooling shaft that is pivotally mounted on the tray either in a permanent manner, or by means of removable clips. The usefulness of the two aforementioned devices is limited, however, to fishing tackle boxes having trays. Moreover, use of both devices is rendered cumbersome and inconvenient because of the fact that the tackle box lid must be open, and because substantial manipulation of the other contents of the tray is likely to be necessary in order for the respooling operation to proceed.

U.S. Pat. No. 4,958,784, issued to Totten, discloses a collapsible fishing line respooling device consisting of a base plate, two pivot arms, two pins to hold the arms on the sides of the base plate, and a shaft that snaps into the pivot arms. The surface of the base plate facing the supply spool is defined by a relieved radius groove designed to accommodate the cylindrical body of a supply spool. During use, the frictional engagement of the supply spool with the shallow concave groove tends to inhibit the tendency of the supply spool to unfurl with excessive rapidity. Since this frictional engagement is achieved only in the presence of a gravitational force pushing the reel onto the surface of the groove, however, the aforementioned device cannot effectively be mounted on vertical surfaces. But it is precisely vertical surfaces which are much more likely to be conveniently free for use on tackle boxes, boats, docks, and the like.

U.S. Pat. No. 5,544,839, issued to Burch, describes a fishing line respooling device consisting of a generally U-shaped base member whose side walls receive a shaft which holds the core of the spool during respooling. The bottom wall of the base is removably attachable to a mounting surface by means of suction cups, and the invention includes a variety of means whereby the rate of rotation of the supply spool may be frictionally regulated during respooling. A considerable difficulty associated with this invention arises from the fact that suction cups are often unsuitable means to securely mount things to surfaces. The surface must be exceptionally smooth, but this is unlikely to be the case on docks or on surfaces within boats. In the event that one instead mounts the device permanently by means of screws or the like, one is faced with the same difficulty attending the use of many of the aforementioned devices, namely, that the device juts out conspicuously and is thus liable to cause interference when not in use.

Finally, World Patent No. WO 93/09667, issued May 27, 1993 to Karr, et al., describes a fishing line respooler consisting of a generally C-shaped frame with a clamp arrangement at one end thereof and a spool arm at the opposite end thereof. The clamp arrangement permits the device to be removably attached to a fishing rod in proximity to the reel to be respooled. This clamp apparatus presents a considerable difficulty in use, however, since it includes a profusion of bolts, thumbscrews, and loose holding brackets which require an involved and time-consuming procedure to engage and disengage from a fishing pole. Moreover, the various components are easily dropped and lost during the process of applying and removing the device.

Examples of other prior art usages for spooling devices that are not specifically intended for employment as fishing line respoolers include: U.S. Pat. No. 902,787, issued to Wiebke, which describes a hand-cranked machine for winding ribbons or other materials upon cards, thin boards, or frames; U.S. Pat. No. 1,795,043, issued to Ross, which describes a dual-spindle sewing machine spool holder intended to permit quick change from one colored thread to another; and U.S. Pat. No. 3,215,361, issued to Jones, Jr., which describes a water ski towline playout and retrieval apparatus intended both to store water ski tow-rope when not in use, as well as allow the water ski tow-rope to be neatly dispensed and respooled during use.

None of the above respooling devices are specifically adapted for montage to an exposed and therefore readily accessible surface while also remaining inconspicuous and non-interfering during periods of non-use. Therefore, none of the above inventions and patents, taken either singly or in combination, is seen to describe the instant invention as claimed.

SUMMARY OF THE INVENTION

Accordingly, it is a principal object of the invention to facilitate the process of respooling reels on fishing rods.

It is another object of the invention to provide a respooling device which may be conveniently mounted to an exposed and therefore readily accessible surface on a tacklebox, boat, dock, or the like.

It is a further object of the invention to provide a respooling device which may be easily moved form one position to another, such that it can be located in a position that is out of the way when not in use.

It is an object of the invention to provide improved elements and arrangements thereof in an apparatus for the purposes described which is inexpensive, dependable and fully effective in accomplishing its intended purposes.

The present invention describes a fishing line spool holder for facilitating the transfer of fishing line from a supply spool to a fishing reel. The spool holder is adapted to be mounted onto the outside of a tackle box, or some other suitable surface affording the particular advantage of being exposed and therefore readily accessible. It includes a mounting bracket and a substantially L-shaped respooling arm pivotally attached to the mounting bracket. The pivoting action allows the respooling arm to be placed in a retracted position flush with the surface to which it is mounted when not in use, and thus out of the way. A frictionally engaging notch mechanism locks the arm into respooling position prior to use. The device further includes at least one tension-cap to prevent uncontrolled rotation and unfurling of the supply spool fishing line during respooling, and at least one ball-bearing washer to assure that the mounting plate apparatus does not interfere with the respooling operation. A spring supplies pressure to the tension cap, and a locking cylinder secures the spool on the device.

The fishing line spool holder of the present invention makes it possible for a fisherman to easily and efficiently replace the fishing line in the reel of his fishing rod without the presence of a second person holding a supply spool. Therefore, what was once an awkward and frustrating process is now readily accomplished with a minimal amount of time and effort.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
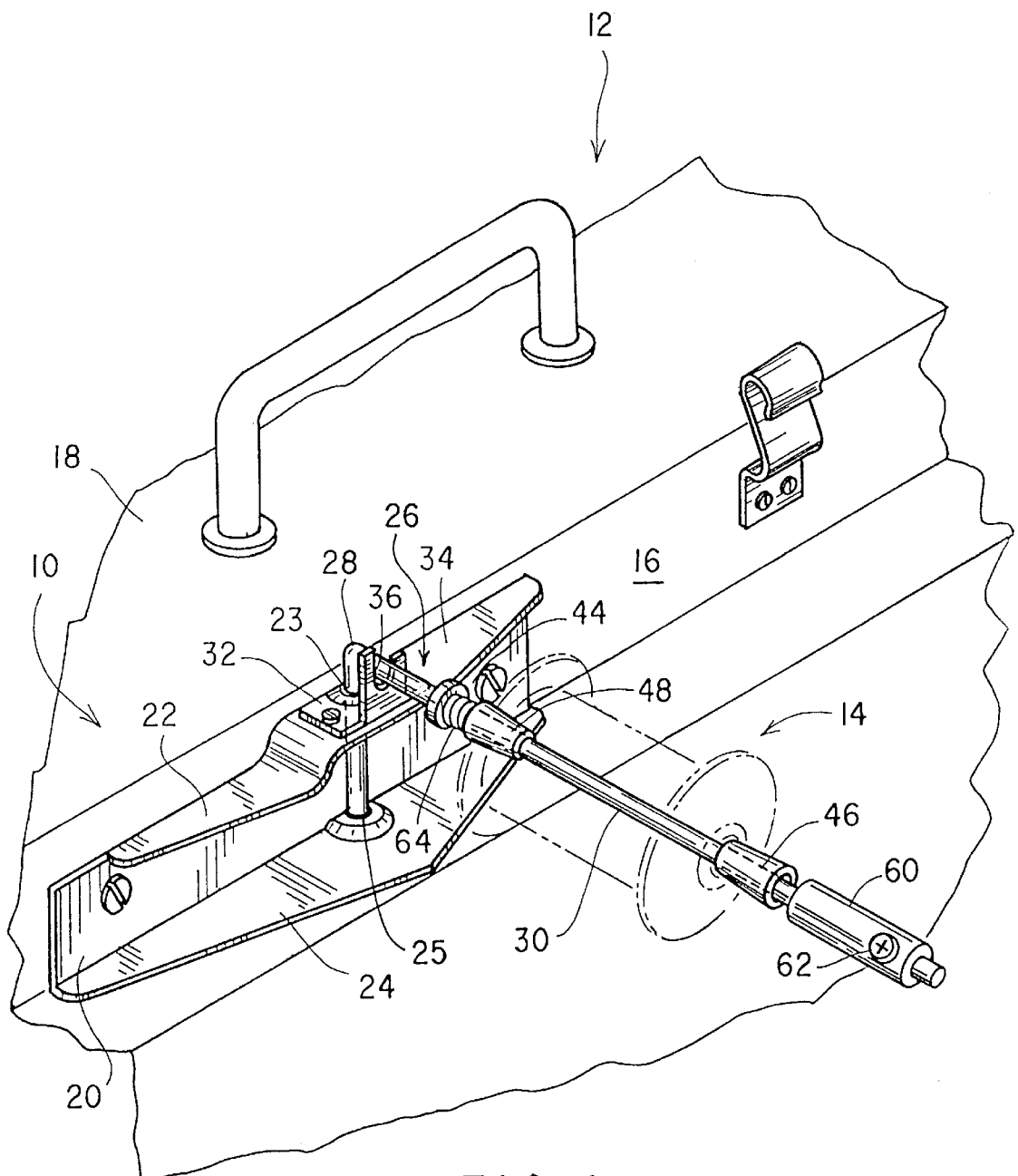
FIG. 1 is a environmental, perspective view showing the respooling device of the present invention attached to the side of a tackle box and aligned in the respooling position.

FIG. 1 is a perspective view of the present invention, designated therein by the general reference numeral 10, in combination with a fishing tackle box assigned the general reference numeral 12. As depicted herein, the respooler 10 is conveniently attached to the front side 16 of the top lid 18 on the box 12. It is to be understood, however, that the present invention may be attached to other locations on tackle boxes, as well as to other surfaces altogether, such as to the sides of boats, docks or the like. FIG. 1 depicts the respooler 10 in the respooling position and ready for use. As such, the respooler 10 has been outfitted with a supply spool of fishing line, designated generally by the reference numeral 14.

The respooler 10 is attached to the tackle box 12 by means of a mounting bracket 20. In the preferred embodiment, this mounting bracket 20 has an upper ledge 22 and a lower ledge 24. Each of the ledges 22 and 24 defines a circular hole or aperture, denoted by the numerals 23 and 25, respectively. The holes 23 and 25 are in orthogonal alignment with respect to the parallel planes defined by the upper and lower ledges, 22 and 24, and are designed to rotatably accommodate a pivoting arm 26, having preferably, a substantially L-shaped spindle element 28. The L-shaped spindle element 28 further includes a horizontally disposed respooling arm 30, along with the vertically disposed pivoting arm 26. Any number of commonly known methods may be used to secure the mounting bracket to the toolbox or an other surface. These methods include, but are not limited to, rivets, nut-and-bolt combinations, and double sided adhesive tape.

The pivoting action of the L-shaped spindle element 28 allows it to be placed into two distinct positions. The first is the respooling position, depicted in FIG. 1, wherein the respooling arm 30 is substantially orthogonal to the mounting surface 16 on the tackle box 12. The second is the retained position, depicted in FIG. 2, wherein the respooling arm 30 is placed in a position longitudinally adjacent the mounting surface 16 of the tackle box 12.

The holding means whereby the respooling arm 30 may be retained in the respooling position consists of a holding bracket 32 affixed to the topmost surface 34 of the upper ledge 22 of the mounting bracket 20. The holding bracket 32 defines a semi-circular retaining notch 36 having a radial center aligned to be coincident with the radial axis of the respooling arm 30 when the respooling arm is in the respooling position. The retaining notch 36 is specifically shaped to frictionally engage the respooling arm 30 when it is moved from the retained position (shown in FIG. 2) into the respooling position (shown in FIG. 1). The notch 36 is shaped so as to circumferentially confine the respooling arm 30 therein, when the respooling arm 30 is positioned in the respooling position.

In order to operate or engage the respooling arm 30 into the respooling position, the respooling arm 30 is placed within the retaining notch 36 by simply snapping the respooling arm 30 into place within the notch. The degree of frictional engagement encountered upon inserting the respooling arm 30 into the retaining notch 36, by a snapping action, should be sufficiently firm enough such that the respooling arm is securely anchored within the retaining notch 36 during the respooling process, but not so firm as to require an undue amount of force to disengage the respooling arm 30 from the retaining notch 36, or to cause any potentially permanent deformation of either the respooling arm 30 or the retaining notch 36.

Figure 2:
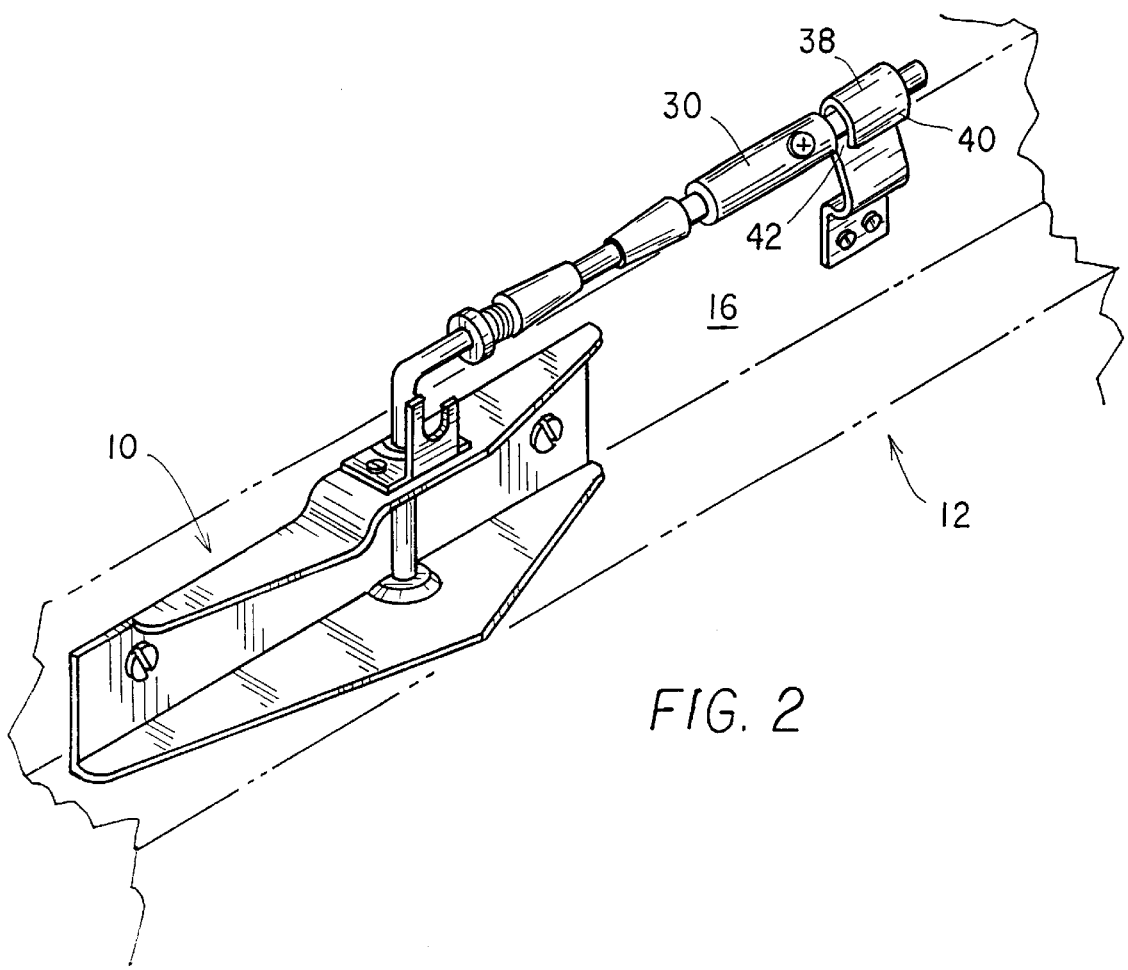
FIG. 2 is a perspective view of the respooling device and associated tackle box with the respooling device held in the retained position.

In a similar manner, a variety of retaining means may be employed to affix the respooling arm 30 in the retained position pictured in FIG. 2. The embodiment presently depicted employs a retaining bracket 38 for this purpose. The retaining bracket 38 comprises a rectangular band, preferably of metal, having a bent end 40 bent in such a manner that it forms a cradle 42 suitable to engage and retain the respooling arm 30. As depicted in FIG. 2, the retaining bracket 38 is mounted on the surface 16 of the tackle box 12 at a location predetermined to allow the respooling arm 30 to rest in the cradle 42 when the respooling arm 30 is in the retained position.

The structure and function of the various components circumposed on the respooling arm 30 when the respooling arm 30 is in the respooling position and ready for use may best be appreciated in FIG. 1. As depicted in FIG. 1, a cylindrical supply spool 14, shown in phantom, for holding a supply of replacement fishing thread is positioned on respooling arm 30. Additionally, a ball-bearing washer 44 is inserted between the retaining notch 36 and the end of the supply spool 14 facing the retaining notch. The function of the ball-bearing washer 44 is to frictionally engage the supply spool 14 during the process of respooling.

A preferred manner in which the instant invention may be used to respool a fishing rod is as follows. After moving the respooling arm 30 from a retained position to a respooling position, a user inserts the supply spool 14 onto the respooling arm 30 such that the supply spool 14 rests against the ball-bearing washer 44. Next, the free end of the fishing line on the spool (not shown) is affixed to a fishing rod and to a reeling device located thereon (also not shown), in the usual and customary fashion. Once this step has been completed, the fishing reel mechanism can be operated in the normal manner, and readied to be respooled with fishing line from the supply spool 14.

Some degree of frictional engagement of at least one of the sides of the supply spool with a fixed object is, however, necessary to prevent the spool from spinning wildly and releasing uncontrolled amounts of fishing line during respooling. But the degree of frictional engagement is preferably fully under the control of the user and thus not affected by structural characteristics of the device not intended to result in frictional engagement. In order to render the degree of frictional engagement fully under control of the user, the present invention in its preferred embodiment and as depicted in FIG. 1, is further equipped with at least one tension cap affixed between outward-facing end of the spool and the open end of the respooling arm. The user may adjust the lateral tension exerted against the side of the supply spool 14 by the tension cap 46 so as to control the rotation of the spool 14 during unspooling. As seen in FIG. 1, the tension cap 46 is preferably shaped as a truncated cone having a cylindrical passage centered at its radial axis passing therethrough. The diameter of this passage should be as such to allow the tension cap 46 to firmly frictionally engage the supply spool 14 when inserted thereon. The tension cap 46 is further secured by locking cylinder 60. The locking cylinder 60 has an internal diameter slightly larger than the external diameter of the respooling arm, so that it can be placed over the respooling arm. Screw 62, located within and perpendicular to locking cylinder 60, is then turned so that it bears on the respooling arm, securing the locking cylinder 60 in place.

In an alternative preferred embodiment, a second tension cap 48 located on the side of the supply spool 14 opposite the side the tension cap 46 is located, may be included to further aid the user in adequately controlling the degree of frictional engagement applied to the supply spool 14. A spring 64, surrounding the respooling arm, biases the tension cap 46 towards the spool 14. When the tension caps 46 and 48 are used, the respooling method as previously described must be adjusted to include their use. Such that the final step of operating a reel to release fishing line off the supply spool 14 is preceded by a step wherein the user positions each tension cap 46 and 48 against the edges of the supply spool 14, such that sufficient lateral tension is applied to the spool 14 in order to control the freedom of the spool 14 to rotate during respooling.

The efficiency and compactness of the present invention greatly enhances the fishing experience. No longer is the process of supplying fishing line from a supply spool to the reel of a fishing rod a time-consuming, tedious task when done by one person. The fishing line spool holder of the present invention facilitates the smooth and even transfer of fishing line from a supply spool to a fishing rod reel in a deft and convenient manner.

The preferred embodiment of the present invention disclosed herein is intended to be illustrative only and is not intended to limit the scope of the invention. It should be understood by those skilled in the art that various modifications and adaptations of the present invention as well as alternative embodiments of the present invention may be contemplated. It is to be understood that the present invention is not limited to the sole embodiment described above, but encompasses any and all embodiments within the scope of the following claims.

I claim:

1. In combination with a fishing tackle box having a surface, a fishing rod respooler for use with a fishing line supply spool, the supply spool having first and second ends, said fishing rod respooler comprising:

a mounting bracket attached to said surface, said mounting bracket having an upper and lower ledge, said upper ledge having a top surface, and said upper and lower ledges each further defining first and second apertures, respectively;

a substantially L-shaped pivoting spindle comprising a pivoting arm integrally attached to a respooling arm, said pivoting arm being pivotally affixed in said first and second apertures, and said respooling arm having a radial axis;

wherein said respooling arm is substantially orthogonal to said surface when in a respooling position, and said respooling arm is longitudinally adjacent said surface when in a retained position;

holding means for holding said respooling arm in said respooling position; and attachment means for attaching said mounting bracket to said surface.

2. The fishing rod respooler recited in claim 1, further including retaining means attached to said surface whereby said respooling arm may be held in said retained position.

3. The fishing rod respooler recited in claim 2, wherein:

said retaining means comprises a retaining bracket, said retaining bracket comprising a bent band defining a cradle for receiving said respooling arm; and said retaining bracket attached to said surface at a location predetermined to allow said respooling arm to rest within said cradle when said respooling arm is in said retained position.

4. The fishing rod respooler recited in claim 1, wherein:

said holding means comprises a holding bracket affixed to said top surface of said upper ledge, said holding bracket defining a semi-circular retaining notch having a radial center aligned to be approximately coincident with said radial axis of said respooling arm when said respooling arm is in said respooling position; and said notch being shaped so as to frictionally engage said respooling arm when said respooling arm is moved from said retained position to said respooling position, said notch further being shaped so as to circumferentially confine said respooling arm therein when said respooling arm is engaged in said respooling position.

5. The fishing rod respooler recited in claim 1, wherein when a supply spool is inserted on said respooling arm, the first end of the supply spool faces inward toward said mounting bracket; and said respooler further includes;

a first ball-bearing washer inserted on said respooling arm between said retaining notch and the first end; and a first tension cap inserted on said respooling arm and resting against the second end of the supply spool so as to exert variable lateral pressure thereagainst.

6. The fishing rod respooler recited in claim 5, further including a second tension cap positioned on said respooling arm between said first ball-bearing washer and the first end of the supply spool and resting against the first end so as to exert variable lateral pressure thereagainst.

7. The fishing rod respooler recited in claim 1, wherein said attachment means comprises a plurality of rivets.

8. The fishing rod respooler recited in claim 1, wherein said attachment means comprises a plurality of bolts.

9. The fishing rod respooler recited in claim 1, wherein said attachment means comprises double sided adhesive.

10. A fishing rod respooler for use with a fishing line supply spool and adapted to mount to a surface, the supply spool having first and second ends, said fishing rod respooler comprising:

a mounting bracket attached to the surface, said mounting bracket having an upper and lower ledge, said upper ledge having a top surface, and said upper and lower ledges each further defining first and second apertures, respectively;

a substantially L-shaped pivoting spindle comprising a pivoting arm integrally attached to a respooling arm, said pivoting arm being pivotally affixed in said first and second apertures, and said respooling arm having a radial axis;

wherein said respooling arm is substantially orthogonal to a surface when in a respooling position, and said respooling arm is longitudinally adjacent said surface when in a retained position;

holding means for holding said respooling arm in said respooling position; and attachment means for attaching said mounting bracket to said surface.

11. The fishing rod respooler recited in claim 10, further including retaining means attached to the surface whereby said respooling arm may be held in said retained position.

12. The fishing rod respooler recited in claim 11, wherein:

said retaining means comprises a retaining bracket, said retaining bracket comprising a bent band defining a cradle for receiving said respooling arm; and said retaining bracket attached to said surface at a location predetermined to allow said respooling arm to rest within said cradle when said respooling arm is in said retained position.

13. The fishing rod respooler recited in claim 10, wherein:

said holding means comprises a holding bracket affixed to said top surface of said upper ledge, said holding bracket defining a semi-circular retaining notch having a radial center aligned to be approximately coincident with said radial axis of said respooling arm when said respooling arm is in said respooling position; and said notch being shaped so as to frictionally engage said respooling arm when said respooling arm is moved from said retained position to said respooling position, said notch further being shaped so as to circumferentially confine said respooling arm therein when said respooling arm is engaged in said respooling position.

14. The fishing rod respooler recited in claim 10, wherein when a supply spool is inserted on said respooling arm, the first end of the supply spool faces inward toward said mounting bracket; and said respooler further includes;

a first ball-bearing washer inserted on said respooling arm between said retaining notch and the first end; and a first tension cap inserted on said respooling arm and resting against the second end of the supply spool so as to exert variable lateral pressure thereagainst.

15. The fishing rod respooler recited in claim 14, further including a second tension cap positioned on said respooling arm between said first ball-bearing washer and the first end of the supply spool and resting against the first end so as to exert variable lateral pressure thereagainst.

16. The fishing rod respooler recited in claim 10, wherein said attachment means comprises a plurality of rivets.

17. The fishing rod respooler recited in claim 10, wherein said attachment means comprises a plurality of bolts.

18. The fishing rod respooler recited in claim 10, wherein said attachment means comprises double sided adhesive.

19. A method of using a fishing rod respooler to respool a fishing rod and reel, said method comprising:

provining a fishing rod having a reel with a reeling mechanism for allowing fishing line to be reeled in;

providing a fishing line supply spool having first and second ends, and fishing line with a free end coiled thereupon;

providing a fishing rod respooler attached to a surface, the fishing rod respooler comprising:

a mounting bracket attached to the surface, the mounting bracket having an upper and lower ledge, the upper ledge having a top surface, and the upper and lower ledges each further defining first and second apertures, respectively;

a substantially L-shaped pivoting spindle comprising a pivoting arm integrally attached to a respooling arm, the pivoting arm being pivotally affixed in the first and second apertures, and the respooling arm having a radial axis;

wherein said respooling arm is substantially orthogonal to the surface when in a respooling position, and said respooling arm is longitudinally adjacent said surface when in a retained position;

holding means for holding said respooling arm in said respooling position; and attachment means for attaching said mounting bracket to said surface;

providing a ball-bearing washer inserted on said respooling arm adjacent said holding means;

providing a tension cap;

moving the respooler from the retained position to said respooling position;

inserting the supply spool onto the respooling arm such that the first end thereof rests against the ball-bearing washer;

positioning the tension cap against the second end of the supply spool so as to apply sufficient lateral pressure thereagainst to control the freedom of the supply spool to rotate;

affixing the free end of the fishing line on the supply spool to the rod and reel; and operating the reeling mechanism to respool the reel with fishing line from the supply spool.

* * * * *